March 3, 1936. P. A. KEENE ET AL 2,032,702
METHOD OF IMPROVING THE PURITY OF CALCIUM CHLORIDE BRINES
Filed May 31, 1934
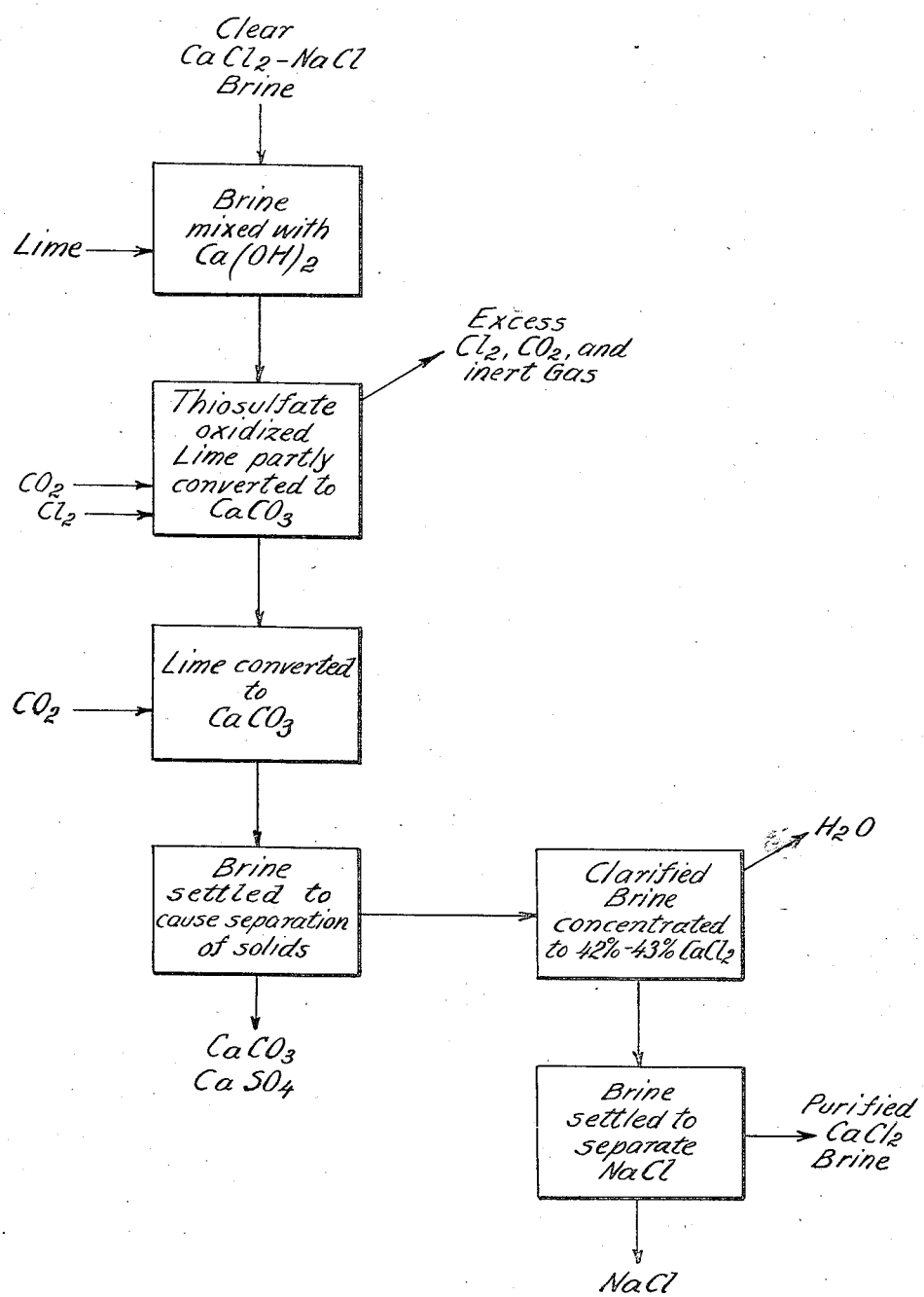
INVENTORS
Paul A. Keene &
BY Arlie P. Julien
ATTORNEY Patented Mar. 3, 1936

2,032,702

UNITED STATES PATENT OFFICE 2,032,702

METHOD OF IMPROVING THE PURITY OF CALCIUM CHLORIDE BRINES

Paul A. Keene and Arlie P. Julien, Syracuse, N. Y., assignors to The Solvay Process Company, New York, N. Y., a corporation of New York Application May 31, 1934, Serial No. 728,385

6 Claims. (Cl. 23—90)

This invention relates to the preparation of calcium chloride and is particularly directed to the production of a calcium chloride of unusually good color from the calcium chloride liquor obtained in the ammonia-soda process.

In the ammonia-soda process sodium bicarbonate is prepared by treating an aqueous sodium chloride solution with ammonia and carbon dioxide. An ammonium chloride liquor is produced as a by-product. In order to regenerate ammonia from this ammonium chloride liquor, it is treated with lime, thus forming calcium chloride and ammonia. The ammonia is again used in the process. The calcium chloride solution that is formed generally contains a rather large proportion of sodium chloride and also impurities.

The raw materials in the preparation of the sodium bicarbonate thus include ammonia, carbon dioxide, and sodium chloride, in addition to lime, which is used for the regeneration of the ammonia. The ammonia is generally obtained as ammonia liquor produced as a by-product from the manufacture of coke. The carbon dioxide and lime are obtained by "burning" limestone with coke in lime kilns. The limestone usually contains some calcium sulfate, which is more or less reduced in the burning process and which, together with the sulfur usually contained in the coke, accounts for oxidizable sulfur compounds, such as thiosulfates and sulfides, contained in the lime and gas from the lime-kilns. The sodium chloride used also contains impurities. From these various sources considerable amounts of impurities are introduced into the system with the result that, prior to the present invention the solid calcium chloride obtained by evaporation of the above-mentioned calcium chloride solution usually has been of a grayish color and the solutions obtained by dissolving it in water are usually dark in color and have a turbidity often exceeding 400 parts per million, of suspended solids.

In the usual purification of calcium chloride-sodium chloride brine resulting from the treatment of the ammonium chloride solution with lime in the ammonia-soda process, the brine is first settled to remove solid material and is then concentrated by evaporation until it contains around 43% by weight of calcium chloride. The brine of this concentration is then cooled and settled to separate sodium chloride. The sodium chloride is separated from the brine by decantation or filtration and the brine further concentrated by evaporation until it contains from 73% to 75% calcium chloride. The product is then bailed into steel drums or flaked or otherwise prepared for shipment or use. The liquor after settling to remove suspended material contains, in addition to calcium chloride and sodium chloride, small amounts of calcium sulfate, sodium thiosulfate, and calcium oxide.

In application Serial No. 554,956 to George N. Terziev, filed August 3, 1931, there is described a process for the removal of calcium sulfate from calcium chloride brines of the above type by adding to the brine milk of lime and then passing carbon dioxide gas through the limed brine so as to produce calcium carbonate in the solution. The calcium carbonate precipitates out and upon settling carries with it calcium sulfate from the solution.

In accordance with the present invention it has been found that if an oxidizing agent is added to the brine before or during the calcium carbonate precipitation step not only calcium sulfate but also thiosulfates, are removed in a very efficient manner. Examples of suitable oxidizing agents are chlorine (either liquid or gaseous), bromine, sodium hypochlorite, hydrogen peroxide, and bleaching powder. The invention particularly contemplates the introduction of chlorine into the calcium chloride brine prior to or during the carbonation of the calcium chloride brine. When the chlorine is introduced prior to the liming step in the above purification process, the subsequent liming serves to neutralize any acid products of chlorination present in the brine. Furthermore, upon carbonation any chlorine dissolved in the solution is expelled by the large quantity of gas passing through the solution. At the same time the chlorine present in the solution tends to oxidize any sulfur compounds that may be present in the carbon dioxide gas employed in the carbonation step. As previously mentioned, the carbon dioxide for carbonation is usually obtained by burning limestone with coke and accordingly some sulfur compounds are frequently present in this gas. If instead of introducing the chlorine gas prior to the liming step, it is introduced during carbonation, it serves even better to destroy any deleterious sulfur compounds present in the carbon dioxide gas employed in the carbonation step. When the brine treated is saturated with calcium sulfate, introduction of chlorine prior to liming forms additional sulfate and may cause separation of sulfate at a point where such separation is not desired. The introduction of the oxidizing agent in the carbonation stage avoids this possibility since the removal of sulfate is desired at this point.

The process of the present invention possesses additional advantages over the processes now in common use for the purification of calcium chloride brines. Ordinarily the purification and evaporation of the calcium chloride brines are effected in cast iron or other iron equipment. Calcium chloride, however, when maintained at an elevated temperature in concentrated solution tends to hydrolyze forming hydrochloric acid. This hydrochloric acid attacks the iron equipment with formation of iron chloride which not only reacts with other products present, but is itself converted by hydrolysis to black (magnetic) iron oxide; hence discoloration of the calcium chloride results.

Although copper is not affected by hydrochloric acid in the degree of dilution in which it is present in such a calcium chloride brine, nevertheless copper equipment is even more attacked by the brine than is iron equipment. This seems to be due to a combined action of the thiosulfates and decomposition products formed therefrom. The thiosulfates present react with copper forming copper sulfide and also decompose forming metal sulfides and sulfur. The hydrochloric acid present as a result of hydrolysis, also reacts with thiosulfates forming additional sulfur and also sulfur dioxide. All of these sulfur compounds are exceedingly detrimental to the copper with which they come in contact and accordingly the use of copper equipment is avoided.

In accordance with the present purification process, however, thiosulfates present in the brine are converted to non-injurious compounds while the brine is yet comparatively dilute. During the processing of the dilute brine relatively little or no hydrolysis takes place and consequently no hydrochloric acid is present to attack iron equipment. For this reason iron may be employed in the early steps of the purification without danger of contaminating the calcium chloride product. Since the thiosulfates present are destroyed before the final concentration of the brine solution is carried out, these compounds and their injurious reaction products are not present during the final concentration. Accordingly copper equipment may be employed without injury and furthermore without any contamination or discoloration of the calcium chloride product.

Preferably the oxidizing agent is employed in a quantity in excess of that theoretically necessary for conversion of thiosulfate present to sulfate. It should be noted that brines of the type herein treated frequently contain small quantities of ammonia which will serve to use up some of the oxidizing agent.

The accompanying flow sheet briefly illustrates the process involved.

As an example of our improved process for the production of a white calcium chloride product the following specific embodiment of our invention is described.

*Example.*—A calcium chloride-sodium chloride brine obtained by mixing calcium hydroxide with the ammonium chloride solution obtained in the ammonia-soda process as described above is settled to remove suspended material. The clear settled brine may possess a composition on the order of the following, expressed in grams per liter of solution—

|  | Grams |
|---|---|
| Calcium chloride, $CaCl_2$ | 114.00 |
| Sodium chloride, NaCl | 48.00 |
| Calcium sulfate, $CaSO_4$ | 1.25 |
| Sodium thiosulfate, $Na_2S_2O_3$ | 0.17 |
| Calcium oxide, CaO | 1.40 |
| Water | 953.00 |

This clear settled brine is treated with a sufficient quantity of milk of lime to provide at least 10 grams of CaO per liter of the calcium chloride solution.

The treated brine containing lime in suspension is caused to pass through two carbonating tanks in series. In each of these carbonating tanks the brine is treated with a carbon dioxide gas such as lime-kiln gas, which contains about 40% $CO_2$. In the first carbonator at the same time that the carbon dioxide is being introduced gaseous chlorine is introduced in sufficient quantity to oxidize 96% to 98% of the thiosulfates or other sulfur compounds to sulfates. The reaction which takes place as a result of the introduction of chlorine may be on the order of the following:

$$CaS_2O_3 + 4Cl_2 + 5Ca(OH)_2 \rightarrow 2CaSO_4 + 4CaCl_2 + 5H_2O$$

For thiosulfates other than calcium thiosulfates a corresponding reaction probably takes place. Substantially complete elimination of thiosulfates and other sulfur compounds wherein the valence of sulfur is less than that in the sulfate may be determined by an iodimetric titration of the brine. It is preferred to continue the chlorination until the thiosulfate present represents not more than 3 cc. of 1/100th normal iodine per liter of the solution. With a brine of the above description this may require about 0.3 to 0.4 gm. of $Cl_2$ per liter of brine.

In the second carbonator additional carbon dioxide is introduced into the solution, as by bubbling it up through the solution or otherwise contacting the liquid and gas. With the usual lime-kiln gas the excess of inert gas passing through the brine aids in removing any remaining chlorine at the same time that the carbon dioxide converts the milk of lime to calcium carbonate. After the second step of the carbonation is complete a little milk of lime is preferably added to neutralize the acid liquor and improve the settling. The brine is then subjected to quiet settling and the clear liquor is decanted from the settled calcium carbonate.

Upon treatment of the representative brine described above in this manner, a calcium chloride-sodium chloride solution is obtained of the following composition expressed in grams per liter of solution—

|  | Grams |
|---|---|
| Calcium chloride, $NaCl_2$ | 112.00 |
| Sodium chloride, NaCl | 47.00 |
| Calcium sulfate, $CaSO_4$ | .25 |
| Sodium thiosulfate, $Na_2S_2O_3$ | .005 |
| Calcium oxide, CaO | .22 |

The deposited solids comprise not only the calcium carbonate from the liming and carbonating process but the calcium sulfate formed by the oxidation process as well as that originally present.

The clear decanted solution is concentrated in vacuum pans or by other suitable evaporators to about 42–43% by weight of calcium chloride, representing 620 to 625 grams of calcium chloride per liter of solution. The solution thus concentrated is then subjected to quiet settling for the removal of sodium chloride. After sodium chloride has settled out, the solution is separated therefrom by decantation and the clear solution may be further concentrated to 73–75% calcium chloride.

The final concentration is preferably effected in copper apparatus or some other apparatus capable of resisting the action of hydrochloric acid of the concentration present in hot concentrated calcium chloride solution. Since iron is detrimentally affected by the concentrated solution, its use preferably is avoided in this concentrating step. By carrying out this last step in the absence of iron the discoloration of the product resulting from the formation of iron compounds by the action of hydrochloric acid is avoided. Since injurious sulfur compounds are no longer present, copper equipment may be used for this final concentration without danger of injury to equipment or discoloration of the calcium chloride product.

The concentrated solution may be poured into steel drums or flaked in the usual manner.

We claim:

1. In the purification of a calcium chloride brine containing thiosulfate wherein the brine is mixed with calcium hydroxide and thereafter subjected to carbonation, the improvement which comprises introducing an oxidizing agent into intimate contact with the brine prior to completion of such carbonation.

2. In the treatment of a thiosulfate-containing calcium chloride brine resulting from the regeneration of ammonia in the ammonia-soda process, wherein the brine is mixed with lime and subsequently subjected to carbonation, the improvement which comprises introducing sufficient chlorine into intimate contact with said brine prior to completion of such carbonation, to oxidize said thiosulfate to sulfate.

3. In the purification of a thiosulfate-containing calcium chloride brine resulting from the regeneration of ammonia in the ammonia-soda process, wherein the brine is mixed with lime and subsequently the limed brine is treated with carbon dioxide, the improvement which comprises introducing chlorine gas into intimate contact with said brine simultaneously with the introduction of carbon dioxide thereto.

4. The method of treating calcium chloride brine resulting from the regeneration of ammonia in the ammonia-soda process said brine containing sodium chloride, calcium sulfate, and a thiosulfate, which method comprises mixing the brine with calcium hydroxide in an amount sufficient to give said brine a CaO content of about 10 grams per liter, subjecting the calcium hydroxide-containing brine to simultaneous treatment with carbon dioxide to convert the calcium hydroxide to calcium carbonate and sufficient chlorine gas to oxidize the thiosulfate present to sulfate, introducing additional carbon dioxide into said solution in amount sufficient to render the solution slightly acid in reaction, and subsequently separating solid matter from the brine.

5. The method of treating calcium chloride brine resulting from the regeneration of ammonia in the ammonia-soda process said brine containing sodium chloride, calcium sulfate, and a thiosulfate, which method comprises mixing the brine with calcium hydroxide in an amount sufficient to give said brine a CaO content of about 10 grams per liter, subjecting the calcium hydroxide-containing brine to simultaneous intimate contact with carbon dioxide to convert the calcium hydroxide to calcium carbonate and sufficient chlorine gas to oxidize the thiosulfate present to sulfate, introducing additional carbon dioxide into said solution in amount sufficient to render the solution slightly acid in reaction, subsequently separating solid matter from the brine, evaporating the resultant brine to a calcium chloride content of about 43%, settling sodium chloride from the solution, and evaporating the resultant solution to a calcium chloride content of at least 73%.

6. The process of purifying a thiosulfate-containing calcium chloride brine resulting from the regeneration of ammonia in the ammonia-soda process, which comprises introducing into said brine calcium hydroxide so that said calcium hydroxide is present in said brine in a quantity equal to many times the quantity of calcium sulfate present, and while said excess of calcium hydroxide is present, introducing into said brine carbon dioxide to convert the calcium hydroxide to calcium carbonate, introducing chlorine into intimate contact with said brine simultaneously with the introduction of carbon dioxide thereto, and separating the resultant precipitate from the solution.

PAUL A. KEENE.
ARLIE P. JULIEN.